United States Patent
Yamamoto et al.

(10) Patent No.: US 9,920,806 B2
(45) Date of Patent: Mar. 20, 2018

(54) FRICTION MATERIAL

(71) Applicant: Nisshinbo Brake, Inc., Tokyo (JP)

(72) Inventors: Kazuhide Yamamoto, Gunma-ken (JP); Toshiya Takada, Gunma-ken (JP)

(73) Assignee: Nisshinbo Brake, Inc., Tokyo (JP)

( * ) Notice: Subject to any disclaimer, the term of this patent is extended or adjusted under 35 U.S.C. 154(b) by 0 days.

(21) Appl. No.: 15/500,516

(22) PCT Filed: Jul. 22, 2015

(86) PCT No.: PCT/JP2015/070778
§ 371 (c)(1),
(2) Date: Jan. 30, 2017

(87) PCT Pub. No.: WO2016/017488
PCT Pub. Date: Feb. 4, 2016

(65) Prior Publication Data
US 2017/0219037 A1    Aug. 3, 2017

(30) Foreign Application Priority Data
Aug. 1, 2014   (JP) ................................ 2014-157769

(51) Int. Cl.
*C09K 3/14* (2006.01)
*F16D 69/02* (2006.01)

(52) U.S. Cl.
CPC ........... *F16D 69/02* (2013.01); *F16D 69/026* (2013.01); *F16D 69/027* (2013.01); *F16D 2200/006* (2013.01); *F16D 2200/0052* (2013.01)

(58) Field of Classification Search
CPC ......... C09K 3/14; C09K 3/149; F16D 65/127; F16D 65/123; F16D 2065/1304; F16D 69/02; F16D 69/026; F16D 69/027; F16D 2200/006; F16D 2200/0052
See application file for complete search history.

(56) References Cited

U.S. PATENT DOCUMENTS

| 2005/0014862 A1* | 1/2005 | Kusaka | ................. F16D 69/026 523/152 |
| 2008/0156226 A1* | 7/2008 | Kitami | ................. F16D 69/026 106/36 |

FOREIGN PATENT DOCUMENTS

| JP | 2009-298847 | 12/2009 |
| JP | 2005-008865 | 12/2012 |
| WO | WO 2012/169546 A1 * | 12/2012 |
| WO | WO 2014/034878 A1 * | 3/2014 |
| WO | WO 2014/115594 A1 * | 7/2014 |

* cited by examiner

*Primary Examiner* — Anthony J Green
(74) *Attorney, Agent, or Firm* — Tracy M. Heims; Apex Juris, pllc.

(57) ABSTRACT

[OBJECT]
The present invention provides a friction material used for a disc brake pad, which is manufactured by forming a non-asbestos-organic (NAO) friction material composition, which is able to suppress an occurrence of noise just before a vehicle stops, while satisfying laws and regulations relating to the required amount of the content of the copper component.
[MEANS TO SOLVE THE PROBLEM]
The friction material for the disc brake pad is manufactured by forming the NAO friction material composition that is free of the copper component, the friction material composition practically does not include an iron component but includes 15-22 weight % of a non-whisker-like titanate, relative to the total amount of the friction material composition, as a titanate, 15-25 weight % of zirconium oxide with the average particle diameter of 1.0-4.0 μm, relative to the total amount of the friction material composition, as the inorganic friction modifier, and 4-6 weight % of cleavable mineral particles, relative to the total amount of the friction material composition, as the inorganic friction modifier.

4 Claims, No Drawings

FRICTION MATERIAL

DETAILED DESCRIPTION OF THE INVENTION

Field of Invention

The present invention relates to a friction material used for a disc brake pad, which is manufactured by forming a non-asbestos-organic (NAO) friction material composition.

Background of Invention

Conventionally, a disc brake is used as a braking device for a passenger car, and a disc brake pad that is formed by adhering a friction material on a metal base member is used as a friction member thereof.

The friction material is classified into a semi-metallic friction material containing, as a fiber base material, 30 weight % or more but less than 60 weight % of a steel fiber relative to the total amount of the friction material composition, a low steel friction material containing a steel fiber in a part of the fiber base material as well as less than 30 weight % of the steel fiber relative to the total amount of the friction material composition, and the NAO friction material containing no steel-based fiber such as the steel fiber and a stainless steel fiber.

The friction material with less occurrence of braking noise is demanded of late years, it is a recent trend to use the disc brake pad that uses the NAO friction material that does not contain the steel-based fiber but mainly contains such as a binder, a fiber base material, a lubricant, a titanate, an inorganic friction modifier, an organic friction modifier, pH adjuster, and a filler.

For the NAO friction material for the disc brake pad, in order to secure the braking effectiveness and abrasive wear resistance under the high speed and high load braking conditions, about 5-20 weight % of a copper component such as fibers and/or particles of copper and/or copper alloy in total relative to the total amount of the friction material composition, is added as a necessary component.

However, the above-described friction material, when braking, discharges the copper as abrasion powder, and it is recently suggested that the discharged copper flows in a river, lake, and/or ocean and then the copper possibly contaminates the area around the discharged copper.

Because of these background, for example, California State (CA) and Washington State (WA) of the United States of America passed a bill to prohibit the sales of the friction member using the friction material containing 5 weight % or more of the copper component relative to the total amount of the friction material composition and an act of assembling the subject friction material in a new car from the year of 2021, and the sales of the friction member using the friction material containing 0.5 weight % or more of the copper component relative to the total amount of the friction material composition and an act of assembling the subject friction material in a new car from the year of 2023 or 2025.

Then, as this type of laws and regulations is expected to be spread out in the world from now on, the elimination of the copper component contained in the NAO friction material is urgently needed, and an issue is to improve the braking effectiveness and wear resistance under the high speed and high load braking conditions, which could be adversely affected due to the reduction of the usage of the copper component contained in the NAO friction material.

Also, when the NAO friction material is in use, a high-frequency vibration noise, called brake squeaking, is less likely to occur, but there is a problem that a low frequency-vibration brake noise called a low-frequency noise tends to occur.

The Patent Document 1 discloses the friction material which is manufactured by forming and curing the friction material composition containing the fiber base, the binder, and the filler, which contains the total of 12 volume % or more of three or more of metal oxides selected from a zinc oxide, a magnesium oxide, a triiron tetroxide, a trimanganese tetraoxide, a tin oxide, and a titanium oxide, and is able to suppress an occurrence of the low frequency noise, to reduces the amount of rotor wear and disc pad wear, and to stably offer high coefficient of friction under the high speed condition, thereby providing a well-balanced friction material.

Also, the Patent Document 2 discloses the friction material which at least contains the fiber base, the binder, and the friction modifier, and further contains composite particles compounding an iron oxide primary particle and resin as a part of the friction modifier, thereby mitigating an occurrence of the noise.

As shown in the Patent Document 1 and the Patent Document 2, it is a well-known technology to a person skilled in this technology that the iron oxide provides inhibitory effect for the low frequency noise However, when the copper component such as the fiber or particles made of copper or copper alloy is removed from the NAO friction material that contains the iron oxide which provides the inhibitory effect for the low frequency noise in order to reduce the environmental load, ironically, it was found that the generation of the low frequency noise, especially, the occurrence of the noise just before a vehicle stops after repeating low load braking actions and allowing the water to enter between the friction surfaces of the friction material and the mating, became more obvious.

PRIOR ARTS

Patent Documents

[PATENT DOCUMENT 1] Japanese Provisional Patent Publication No. 2005-008865
[PATENT DOCUMENT 2] Japanese Provisional Patent Publication No. 2009-298847

SUMMARY OF INVENTION

Problems to be Resolved by the Invention

This invention is to provide the friction material used for the disc brake pad, which is manufactured by forming the NAO friction material composition, which is able to suppress an occurrence of noise just before a vehicle stops, while satisfying laws and regulations relating to the required amount of the content of the copper component.

Means to Resolve the Problems

It is assumed that the noise, just before a vehicle stops, occurs through the following mechanism:
(a) if the copper component is added to the friction material, adhesive wear of the copper component between the copper transfer film formed on the surface of the mating member and the friction material surface is predominant, and therefore, an abrasion powder of the mating member is hard to be generated; however, if the copper component is eliminated, then the abrasive wear of the inorganic friction modifier as a grinding member contained in the friction material is predominate, and therefore, an abrasion powder of the mating member tends to be generated. Accordingly, the friction material surface is ground by the abrasion powder of the mating member, and therefore, the generation of the abrasion powder of the friction material is accelerated.

(b) by repeating the low load braking actions, the abrasion powders that are not ejected from the gap between the friction surfaces of the friction material and the mating member are micronized as receiving a shearing force.

(c) under this circumstance, water enters between the friction surfaces of the friction material and the mating member, and if the low load braking actions are further repeated, the micronized abrasion powder is kneaded with water, thereby generating an abrasion powder aggregate.

(d) rusting occurs from the iron oxide contained in the abrasion powder of the mating member and/or the abrasion powder of the friction material both existing in the abrasion powder aggregate as a starting point, and aggregation force of the abrasive powder aggregate becomes stronger.

(e) when braking while such abrasive powder aggregate is existing between the friction surfaces of the friction material and the mating member, the abrasive powder aggregate collapses due to the shearing force, which causes slipping between the friction material and the mating member, and vibrations by the slipping occurs the low frequency noise.

The inventors, after serious investigation, completed this invention as knowing that the occurrence of the noise, just before a vehicle stops, can be suppressed by not adding a material that could cause rusting into the friction material composition but by adding the predetermined amount of the particular titanate and the particular inorganic friction modifier so as to suppress the abrasion wear of the mating member, adding the predetermined amount of the particular inorganic friction modifier to suppress the generation of the abrasion powder aggregate, and adding the predetermined amount of the particular lubricant carbonaceous so as to facilitate the ejection of the abrasion powder from the gap between the friction surfaces of the friction material and the mating member during the low load braking actions.

This invention relates to the friction material used for the disc brake pad, which is manufactured by forming the NAO friction material composition that is free of the copper component, and is based on the following technical features:

(1) The friction material used for a disc brake pad, which is manufactured by forming NAO friction material composition that is free of the copper component, where the friction material composition practically does not include the iron component but includes 15-25 weight % of the non-whisker-like titanate, relative to the total amount of the friction material composition, as the titanate, 15-25 weight % of zirconium oxide with the average particle diameter of 1.0-4.0 μm, relative to the total amount of the friction material composition, as the inorganic friction modifier, and 4-6 weight % of cleavable mineral particles, relative to the total amount of the friction material composition, as the inorganic friction modifier.

(2) The friction material according to (1), where the non-whisker-like titanate is potassium titanate in the infinite shape.

(3) The friction material according to (1) or (2), where the friction material composition includes 2-4 weight % of flaky graphite particles relative to the total amount of the friction material composition as the carbonaceous lubricant.

Advantage of the Invention

According to the present invention, in the friction material used for a disc brake pad, which is manufactured by forming the NAO friction material composition, the present invention can offer the friction material that can suppress the occurrence of noise just before the vehicle stops after repeating the low load braking actions and allowing the water to enter between the friction surfaces of the friction material and the mating member while satisfying laws and regulations relating to the required amount of the content of the copper component.

EMBODIMENT OF THE INVENTION

In the present invention, in order to suppress the wear of the mating member, 15-25 weight % of the non-whisker-like titanate relative to the total amount of the friction material composition as the titanate and 15-25 weight % of zirconium oxide with the average particle diameter of 1.0-4.0 μm relative to the total amount of the friction material composition as the inorganic friction modifier, are added thereto.

In the present invention, non-whisker-like titanate means titanate that is not in an acicular or whisker shape with the aspect ratio of 3 or more, and more concretely it means a platy titanate shaped in such as polygon, circle, or oval, or a titanate having an amoebic shape or a shape such as a piece of jigsaw puzzle as shown in the international publication no. 2008/123046.

By adding relatively large amount of the non-whisker-like titanate and the small particle sized zirconium oxide to the friction material composition, a film made of titanate and zirconium oxide is formed on the friction surface of the mating member.

This film prevents direct-grinding of the friction surface of the mating member by the inorganic friction modifier contained in the friction material acting as a grinding factor, thereby suppressing the generation of the abrasion powder of the mating member.

If the amount of the non-whisker-like titanate and zirconium oxide is insufficient, the problem that the sufficient inhibitory effect on the abrasive wear for the mating member cannot be obtained, may occur, and if the amount of the non-whisker-like titanate and zirconium oxide is excessive, the problem that the braking effectiveness becomes unstable, may occur.

Also, if the average particle diameter of the zirconium oxide is too small, the problem that the cracks tend to occur in the friction material due to deterioration of moldability of the friction material, may occur, and if the average particle size of the zirconium oxide is excessively large, the problem that the braking effectiveness becomes unstable, may occur.

The present invention, as an average particle diameter, uses a particle diameter (D50) measured by a laser diffraction method.

Furthermore, in the present invention, in order to suppress the generation of the abrasion powder aggregate, 4-6 weight % of the cleavable mineral particles relative to the total amount of the friction material composition is added therein.

The abrasion powder of the cleavable mineral particle discharged from the friction material is in a platy shape, and it is expected that if the platy particle is blended in the abrasion powder aggregates, slipping among the abrasion powder near the platy particle occurs, which tends to deteriorates the abrasive powder aggregate.

If the amount of cleavable mineral particles contained therein is insufficient, the problem that the inhibitory effect to prevent the generation of the abrasion powder aggregate cannot be obtained sufficiently, may occur, and if the amount of cleavable mineral particles contained therein is excessive, the friction surface of the mating member becomes like a mirror-finished surface, the problem that the brake squeaking tend to occur due to a sudden increase of the friction coefficient at the moisture absorption period, may occur.

Materials for the cleavable mineral particles may be such as mica and vermiculite, and one or combination of two materials may be used.

The average particle diameter of the cleavable mineral particle is preferably 50-700 μm, but the average diameter of 300-600 μm is more preferable.

Then, the friction material composition of the present invention practically does not contain the iron component, thereby suppressing the generation of rust that could be a factor to increase the cohesive force of the abrasion powder aggregate. Here, the definition for the iron component not practically contained is that materials having iron as a main component such as iron, iron alloy, and iron compounds is not added to the friction material composition.

The non-whisker-like titanate may be such as potassium titanate, lithium potassium titanate, and magnesium potassium titanate, and one or any combination of two or more of the above-mentioned titanate may be used; however, it is preferable to use an infinite shape potassium titanate alone.

When the infinite shape potassium titanate is used, while multiple potassium titanate pieces are complexly superposing each other, the composite film with the zirconium oxide is formed on the friction surface of the mating member. This composite film shows more strength than the film formed when the platy titanate is in use, and more preferable inhibitory effect for wearing of the mating member may be obtained.

Further, in the present invention, when in the low load braking action, because the abrasion powder tends to be discharged from the friction surface between the friction material and the mating member, 2-4 weight % of the flaky graphite particles relative to the total amount of the friction material composition is added to the friction material composition as the carbonaceous lubricant.

The flaky graphite particles may be obtained by precisely crushing the expanded graphite particles that are obtained by thermally expanding the particles of such as a natural squamous graphite, a kish graphite, and a pyrolytic graphite dozens of times or hundreds of times.

If the abrasion powder itself does not have the lubricity, the abrasion powder, while not being discharged from the friction surfaces of the friction material and the mating member, is accumulated in fine unevenness on the friction surfaces of the friction material and/or the mating member, which tends to generate the abrasion powder aggregate that could be a cause of the noise; however, by adding an appropriate amount of the flaky graphite particles to the friction material composition, the flaky graphite particles are blended in the generated abrasion powder, which provides lubricity to the abrasion powder itself, thereby smoothly ejecting the abrasion powder without accumulating in the fine unevenness on the above-described friction surfaces.

The friction material in the present invention is made from the friction material composition that includes conventional materials used for the friction material such as the binder, the fiber base, the lubricant, the inorganic friction modifier, the organic friction modifier, the pH adjuster, the filler or the like, in addition to the above-described non-whisker-like titanate, the zirconium oxide with the average particle diameter of 1.0-4.0 μm, the cleavable mineral particles, and the flaky graphite particles The binder may be one or any combination of two or more of conventionally used binders for the friction material, selected from such as a straight phenolic resin, a resin obtained by modifying the phenolic resin with cashew oil, silicone oil, or various elastomers such as an acrylic rubber, an aralkyl modified phenolic resin obtained by reacting the phenolic compound, aralkyl ether compound and aldehyde compound, the thermosetting resin dispersing such as various elastomers or fluorine-containing polymer in the phenolic resin or the like. The content of the binder is preferably 5-8 weight % relative to the total amount of the friction material composition but more preferably 6-7 weight % relative to the total amount of the friction material composition.

The fiber base may be one or any combination of two or more of the conventionally used organic fibers for the friction material such as an aramid fiber, a cellulosic fiber, a poly-p-phenylenebenzobisoxazole (PBO) fiber, and an acrylic fiber. The content of the fiber base is preferably 1-4 weight % relative to the total amount of the friction material composition but more preferably 2-3 weight % relative to the total amount of the friction material composition.

The lubricant, other than the above described flaky graphite particles, may be one or any combination of two or more materials selected from the carbonaceous lubricant such as a petroleum coke, an artificial graphite particles, and a natural graphite particles, and metal sulfide type lubricant such as a molybdenum disulfide, a zinc sulfide, a tin sulfide, and a composite metal sulfide. The content of the lubricant is preferably 4-8 weight % relative to the total amount of the friction material composition together with the above-described flaky graphite particles but more preferably 5-7 weight % relative to the total amount of the friction material composition.

The inorganic friction modifier, other than the above-described zirconium oxide with the average particle diameter of 1.0-4.0 μm and the cleavable mineral particles with the average particle diameter of 300-600 μm, the inorganic friction modifier may be one or any combination of two or more of the materials selected from a particulate inorganic friction modifier such as a calcium silicate, a magnesium oxide, a γ alumina, and a zirconium silicate, and a fibrous inorganic friction modifier such as a wollastonite, a sepiolite, a basalt fiber, a grass fiber, a biosoluble artificial mineral fiber, and rock wool.

The content of the inorganic friction modifier, together with the above-described zirconium oxide with the average particle diameter of 1.0-4.0 μm and the cleavable mineral particle with the average particle diameter of 300-600 μm, is preferably 25-40 weight % relative to the total amount of the friction material composition but more preferably 30-35 weight % relative to the total amount of the friction material composition.

The organic friction modifier may be one or any combination of two or more of the materials selected from the organic friction modifiers conventionally used for the friction material such as a cashew dust, pulverized powders of the tire tread rubber, a vulcanized rubber powder or an unvulcanized rubber powder such as a nitrile rubber, an acrylic rubber, a silicone rubber, and a butyl rubber.

The content of the organic friction modifier is preferably 4-8 weight % relative to the total amount of the friction material composition but more preferably 5-7 weight % relative to the total amount of the friction material composition.

The pH adjuster may be a conventionally used pH adjuster for the friction material such as the calcium hydroxide.

The pH adjuster is preferably 1-5 weight % relative to the total amount of the friction material composition but more preferably 2-4 weight % relative to the total amount of the friction material composition.

The filler such as the barium sulfate and the calcium carbonate is used as the remaining portion of the friction material composition.

The friction material of this invention used for the disc brake is manufactured through a mixing step to obtain a raw friction material mixture by uniformly mixing the predetermined amount of the friction material composition using a mixer, a heat press forming step to obtain a molded product by heat press forming the raw friction material mixture positioned in the heat forming die superposed on the separately pre-cleaned, surface treated, and adhesive applied back plate, a heat treatment step of heating the molded product to complete the cure reaction of the binder thereon, a coating step of applying the coating thereon, a baking step of baking the coating thereon, and a grinding step of forming the friction surface.

As necessary, prior to the heat press forming step, the granulation step of granulating the raw friction material mixture, the kneading step of kneading the raw friction material mixture, and the pre-forming step of forming an unfinished preformed article by positioning the raw friction material mixture, the granulated raw friction material mixture obtained through the granulation step or the kneaded raw friction material mixture obtained through the kneading step into the pre-forming die, are performed. In addition, after the heat press forming step, the scorching step may be performed.

[Embodiments]

In the following sections, the embodiments and the comparative examples are disclosed to concretely explain this invention; however, this invention is not limited to the following embodiments.

[The Manufacturing Method of the Friction Material of Embodiments 1-20/Comparative Examples 1-8]

The each friction material composition shown in TABLE 1 and TABLE 2 is mixed for 5 minutes by the Loedige mixer and is pressed in the forming die under 30 MPa for 10 seconds to form an unfinished pre-forming article. This unfinished pre-forming article is superposed on the previously cleaned, surface-treated and adhesive-coated steel back plate to form for 10 minutes in the heat press forming die at the forming temperature of 150 centigrade under the forming pressure of 40 MPa, to heat treatment (post-curing) for 5 hours at 200 centigrade, and to grind to form the friction surface for the disc brake pad of the passenger car (Embodiments 1-20 and Comparative Examples 1-8).

TABLE 1

|  |  | Embodiments | | | | | | | | | | | | | |
| --- | --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 12 | 13 | 14 |
| Binder | Straight Phenolic Resin | 7.0 | 7.0 | 7.0 | 7.0 | 7.0 | 7.0 | 7.0 | 7.0 | 7.0 | 7.0 | 7.0 | 7.0 | 7.0 | 7.0 |
| Fiber | Aramid Fiber | 3.0 | 3.0 | 3.0 | 3.0 | 3.0 | 3.0 | 3.0 | 3.0 | 3.0 | 3.0 | 3.0 | 3.0 | 3.0 | 3.0 |
| Carbon Type Lubricant | Coke | 2.0 | 2.0 | 2.0 | 2.0 | 2.0 | 2.0 | 2.0 | 2.0 | 2.0 | 2.0 | 2.0 | 2.0 | 2.0 | 2.0 |
|  | Flaky Graphite Particle | 3.0 | 3.0 | 3.0 | 3.0 | 3.0 | 3.0 | 3.0 | 3.0 | 3.0 | 3.0 | 3.0 | 3.0 | 3.0 | 3.0 |
| Metal Sulfide Type Lubricant | Zinc Sulfide | 1.0 | 1.0 | 1.0 | 1.0 | 1.0 | 1.0 | 1.0 | 1.0 | 1.0 | 1.0 | 1.0 | 1.0 | 1.0 | 1.0 |
| Titanate | Potassium Titanate (Infinite Shape) | 20.0 |  |  | 15.0 | 25.0 | 20.0 | 20.0 | 20.0 | 20.0 | 20.0 | 20.0 | 20.0 | 20.0 | 20.0 |
|  | Potassium Titanate (Platy Shape) |  | 20.0 |  |  |  |  |  |  |  |  |  |  |  |  |
|  | Lithium Potassium Titanate (Platy Shape) |  |  | 20.0 |  |  |  |  |  |  |  |  |  |  |  |
| Inorganic Friction Modifier | Biosoluable Rock Wool | 3.0 | 3.0 | 3.0 | 3.0 | 3.0 | 3.0 | 3.0 | 3.0 | 3.0 | 3.0 | 3.0 | 3.0 | 3.0 | 3.0 |
|  | Zirconium Oxide (Average Particle Diameter = 0.5 μm) |  |  |  |  |  |  |  |  |  |  |  |  |  |  |
|  | Zirconium Oxide (Average Particle Diameter = 1.0 μm) |  |  |  |  |  | 20.0 |  |  |  |  |  |  |  |  |

TABLE 1-continued

| | | Embodiments | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| | Zirconium Oxide (Average Particle Diameter = 2.0 μm) | 20.0 | 20.0 | 20.0 | 20.0 | 20.0 | | | 15.0 | 25.0 | 20.0 | 20.0 | 20.0 | 20.0 | 20.0 |
| | Zirconium Oxide (Average Particle Diameter = 4.0 μm) | | | | | | | 20.0 | | | | | | | |
| | Zirconium Oxide (Average Particle Diameter = 5.0 μm) | | | | | | | | | | | | | | |
| | Zirconium Silicate | 1.0 | 1.0 | 1.0 | 1.0 | 1.0 | 1.0 | 1.0 | 1.0 | 1.0 | 1.0 | 1.0 | 1.0 | 1.0 | 1.0 |
| | Mica (Average Particle Diameter = 50 μm) | | | | | | | | | | 5.0 | | | | |
| | Mica (Average Particle Diameter = 100 μm) | | | | | | | | | | | 5.0 | | | |
| | Mica (Average Particle Diameter = 300 μm) | 5.0 | 5.0 | 5.0 | 5.0 | 5.0 | 5.0 | 5.0 | 5.0 | 5.0 | | | | | |
| | Mica (Average Particle Diameter = 600 μm) | | | | | | | | | | | | 5.0 | | |
| | Mica (Average Particle Diameter = 700 μm) | | | | | | | | | | | | | 5.0 | |
| | Vermiculite (Average Particle Diameter = 600 μm) | | | | | | | | | | | | | | 5.0 |
| | γ-Alumina | 1.0 | 1.0 | 1.0 | 1.0 | 1.0 | 1.0 | 1.0 | 1.0 | 1.0 | 1.0 | 1.0 | 1.0 | 1.0 | 1.0 |
| Organic Friction Modifier | Cashew Dust | 5.0 | 5.0 | 5.0 | 5.0 | 5.0 | 5.0 | 5.0 | 5.0 | 5.0 | 5.0 | 5.0 | 5.0 | 5.0 | 5.0 |
| | Pulverized Powder Of Tire Tread Rubber | 2.0 | 2.0 | 2.0 | 2.0 | 2.0 | 2.0 | 2.0 | 2.0 | 2.0 | 2.0 | 2.0 | 2.0 | 2.0 | 2.0 |
| pH Adjuster | Calcium Hydroxide | 3.0 | 3.0 | 3.0 | 3.0 | 3.0 | 3.0 | 3.0 | 3.0 | 3.0 | 3.0 | 3.0 | 3.0 | 3.0 | 3.0 |
| Filler | Barium Sulfate | 24.0 | 24.0 | 24.0 | 29.0 | 19.0 | 24.0 | 24.0 | 29.0 | 19.0 | 24.0 | 24.0 | 24.0 | 24.0 | 24.0 |
| | Total | 100.0 | 100.0 | 100.0 | 100.0 | 100.0 | 100.0 | 100.0 | 100.0 | 100.0 | 100.0 | 100.0 | 100.0 | 100.0 | 100.0 |

TABLE 2

| | | Embodiments | | | | | | Comparative Examples | | | | | | | |
|---|---|---|---|---|---|---|---|---|---|---|---|---|---|---|---|
| | | 15 | 16 | 17 | 18 | 19 | 20 | 1 | 2 | 3 | 4 | 5 | 6 | 7 | 8 |
| Binder | Straight Phenolic Resin | 7.0 | 7.0 | 7.0 | 7.0 | 7.0 | 7.0 | 7.0 | 7.0 | 7.0 | 7.0 | 7.0 | 7.0 | 7.0 | 7.0 |

TABLE 2-continued

|  |  | Embodiments |  |  |  |  |  | Comparative Examples |  |  |  |  |  |  |  |
|---|---|---|---|---|---|---|---|---|---|---|---|---|---|---|---|
|  |  | 15 | 16 | 17 | 18 | 19 | 20 | 1 | 2 | 3 | 4 | 5 | 6 | 7 | 8 |
| Fiber | Aramid Fiber | 3.0 | 3.0 | 3.0 | 3.0 | 3.0 | 3.0 | 3.0 | 3.0 | 3.0 | 3.0 | 3.0 | 3.0 | 3.0 | 3.0 |
| Carbon | Coke | 2.0 | 2.0 | 4.0 | 3.0 | 1.0 |  | 2.0 | 2.0 | 2.0 | 2.0 | 2.0 | 2.0 | 2.0 | 2.0 |
| Type Lubricant | Flaky Graphite Particle | 3.0 | 3.0 | 1.0 | 2.0 | 4.0 | 5.0 | 3.0 | 3.0 | 3.0 | 3.0 | 3.0 | 3.0 | 3.0 | 3.0 |
| Metal Sulfide Type Lubricant | Zinc Sulfide | 1.0 | 1.0 | 1.0 | 1.0 | 1.0 | 1.0 | 1.0 | 1.0 | 1.0 | 1.0 | 1.0 | 1.0 | 1.0 | 1.0 |
| Titanate | Potassium Titanate (Infinite Shape) | 20.0 | 20.0 | 20.0 | 20.0 | 20.0 | 20.0 | 10.0 | 30.0 | 20.0 | 20.0 | 20.0 | 20.0 | 20.0 | 20.0 |
|  | Potassium Titanate (Platy Shape) |  |  |  |  |  |  |  |  |  |  |  |  |  |  |
|  | Lithium Potassium Titanate (Platy Shape) |  |  |  |  |  |  |  |  |  |  |  |  |  |  |
| Inorganic Friction Modifier | Biosoluable Rock Wool | 3.0 | 3.0 | 3.0 | 3.0 | 3.0 | 3.0 | 3.0 | 3.0 | 3.0 | 3.0 | 3.0 | 3.0 | 3.0 | 3.0 |
|  | Zirconium Oxide (Average Particle Diameter = 0.5 μm) |  |  |  |  |  |  |  |  |  | 20.0 |  |  |  |  |
|  | Zirconium Oxide (Average Particle Diameter = 1.0 μm) |  |  |  |  |  |  |  |  |  |  |  |  |  |  |
|  | Zirconium Oxide (Average Particle Diameter = 2.0 μm) | 20.0 | 20.0 | 20.0 | 20.0 | 20.0 | 20.0 | 20.0 | 20.0 |  |  | 10.0 | 30.0 | 20.0 | 20.0 |
|  | Zirconium Oxide (Average Particle Diameter = 4.0 μm) |  |  |  |  |  |  |  |  |  |  |  |  |  |  |
|  | Zirconium Oxide (Average Particle Diameter = 5.0 μm) |  |  |  |  |  |  |  |  |  | 20.0 |  |  |  |  |
|  | Zirconium Silicate | 1.0 | 1.0 | 1.0 | 1.0 | 1.0 | 1.0 | 1.0 | 1.0 | 1.0 | 1.0 | 1.0 | 1.0 | 1.0 | 1.0 |
|  | Mica (Average Particle Diameter = 50 μm) |  |  |  |  |  |  |  |  |  |  |  |  |  |  |
|  | Mica (Average Particle Diameter = 100 μm) |  |  |  |  |  |  |  |  |  |  |  |  |  |  |

TABLE 2-continued

|  |  | Embodiments | | | | | | Comparative Examples | | | | | | | |
|---|---|---|---|---|---|---|---|---|---|---|---|---|---|---|---|
|  |  | 15 | 16 | 17 | 18 | 19 | 20 | 1 | 2 | 3 | 4 | 5 | 6 | 7 | 8 |
|  | Mica (Average Particle Diameter = 300 μm) | 4.0 | 6.0 | 5.0 | 5.0 | 5.0 | 5.0 | 5.0 | 5.0 | 5.0 | 5.0 | 5.0 | 5.0 | 3.0 | 7.0 |
|  | Mica (Average Particle Diameter = 600 μm) | | | | | | | | | | | | | | |
|  | Mica (Average Particle Diameter = 700 μm) | | | | | | | | | | | | | | |
|  | Vermiculite (Average Particle Diameter = 600 μm) | | | | | | | | | | | | | | |
|  | γ-Alumina | 1.0 | 1.0 | 1.0 | 1.0 | 1.0 | 1.0 | 1.0 | 1.0 | 1.0 | 1.0 | 1.0 | 1.0 | 1.0 | 1.0 |
| Organic Friction Modifier | Cashew Dust | 5.0 | 5.0 | 5.0 | 5.0 | 5.0 | 5.0 | 5.0 | 5.0 | 5.0 | 5.0 | 5.0 | 5.0 | 5.0 | 5.0 |
|  | Pulverized Powder Of Tire Tread Rubber | 2.0 | 2.0 | 2.0 | 2.0 | 2.0 | 2.0 | 2.0 | 2.0 | 2.0 | 2.0 | 2.0 | 2.0 | 2.0 | 2.0 |
| pH Adjuster | Calcium Hydroxide | 3.0 | 3.0 | 3.0 | 3.0 | 3.0 | 3.0 | 3.0 | 3.0 | 3.0 | 3.0 | 3.0 | 3.0 | 3.0 | 3.0 |
| Filler | Barium Sulfate | 25.0 | 23.0 | 24.0 | 24.0 | 24.0 | 24.0 | 34.0 | 14.0 | 24.0 | 24.0 | 34.0 | 14.0 | 26.0 | 22.0 |
|  | Total | 100.0 | 100.0 | 100.0 | 100.0 | 100.0 | 100.0 | 100.0 | 100.0 | 100.0 | 100.0 | 100.0 | 100.0 | 100.0 | 100.0 |

The obtained friction materials were evaluated with respect to the noise, the stability of braking effectiveness, the brake squeaking, and the product appearance. The results of the evaluation are shown in TABLE 3 and TABLE 4 while the evaluation standards are shown in TABLE 5 and TABLE 6.

TABLE 3

|  |  | Embodiments | | | | | | | | | | | | | |
|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 |
| Evaluation Result | Noise | ◎ | ○ | ○ | △ | ◎ | △ | ○ | ○ | ◎ | ○ | ◎ | ◎ | ◎ | ◎ |
|  | Stability of Braking Effectiveness | ◎ | ○ | ○ | ◎ | △ | ○ | △ | ◎ | △ | ◎ | ◎ | ◎ | ◎ | ◎ |
|  | Squeaking Noise | ◎ | ◎ | ◎ | ◎ | ◎ | ◎ | ◎ | ◎ | ◎ | ◎ | ◎ | ◎ | ○ | ○ |
|  | Product Appearance | ○ | ○ | ○ | ○ | ○ | ○ | ○ | ○ | ○ | ○ | ○ | ○ | ○ | ○ |

TABLE 4

|  |  | Embodiments | | | | | | Comparative Examples | | | | | | | |
|---|---|---|---|---|---|---|---|---|---|---|---|---|---|---|---|
|  |  | 15 | 16 | 17 | 18 | 19 | 20 | 1 | 2 | 3 | 4 | 5 | 6 | 7 | 8 |
| Evaluation Result | Noise | ○ | ◎ | ○ | ◎ | ◎ | ◎ | X | ◎ | — | ○ | X | ◎ | X | ◎ |
|  | Stability of Braking Effectiveness | ◎ | ◎ | ◎ | ◎ | ◎ | ○ | ◎ | X | — | X | ◎ | X | ◎ | ◎ |
|  | Squeaking Noise | ◎ | ○ | ◎ | ◎ | ◎ | ◎ | ◎ | ◎ | — | ◎ | ◎ | ◎ | ◎ | X |
|  | Product Appearance | ○ | ○ | ○ | ○ | ○ | ○ | ○ | ○ | X | ○ | ○ | ○ | ○ | ○ |

TABLE 5

| | | Noise | Stability of Braking Effectiveness | Squeaking Noise |
|---|---|---|---|---|
| Evaluation Method | | Actual Vehicle Test<br>Burnish<br>Initial Velocity: 30 km/h,<br>Deceleration: 0.1G<br>Braking Cycle: 3,000<br>↓<br>Allowed to Stand Overnight<br>↓<br>0.5-3.0 MPa (0.5 pitch)<br>Initial Velocity: 10 km/h<br>Forwarding and Backwarding:<br>twice | Based on JASO C406<br>Passenger Car - Braking Device -<br>Dynamometer Test Procedures | Burnish<br>Based on JASO C406<br>Passenger Car - Braking Device -<br>Dynamometer Test Procedures<br>↓<br>Assembled in the Actual Vehicle<br>and Allowed to Stand Overnight<br>↓<br>Initial Velocity: 5 km/h,<br>Deceleration: 0.1G<br>Braking Cycle: 10 |
| Evaluation Items | | Noise at Vehicle Stopping<br>(Sensory Evaluation) | Difference Between Friction<br>Coefficient (Average Value) on<br>Low Temperature Effectiveness<br>Test and Friction Coefficient<br>(Average Value) on Second<br>Effectiveness Test | High Frequency Noise<br>(Secondary Evaluation) of 2 kHz<br>or more<br>(Sensory Evaluation) |
| Evaluation Standard | ◉ | Noise Discoverable Only After<br>Serous Attempts to Create Noise<br>(Light Sliding Sound Level) | 0% or More but Less Than 3% | No noise |
| | ○ | Noise Discoverable Only After<br>Serous Attempts to Create Noise<br>(Bearable Level if Discovered) | 3% or More but Less Than 6% | Minimum Level Noise |
| | Δ | Noise but Bearable Level | 6% or More but Less Than 10% | Small Noise |
| | X | Disturbing Noise | 10% or More | Medium Level Noise |
| | — | No Evaluation Because of<br>Wrinkle or Crack on the Product | No Evaluation Because of<br>Wrinkle or Crack on the Product | No Evaluation Because of<br>Wrinkle or Crack on the Product |

TABLE 6

| | | Product Appearance |
|---|---|---|
| Evaluation Method | | Visual Check on Product Appearance |
| Evaluation Item | | Existence of Wrinkle and Crack |
| Evaluation Standard | ○ | No Wrinkle or Crack |
| | X | Wrinkle or Crack |

INDUSTRIAL APPLICABILITY

The present invention provides the friction material used for a disc brake pad, which is manufactured by forming a non-asbestos-organic (NAO) friction material composition, which is able to suppress the occurrence of noise just before the vehicle stops, while satisfying laws and regulations relating to the required amount of the content of the copper component.

The invention claimed is:

1. A friction material used for a disc brake pad, which is manufactured by forming a non-asbestos organic (NAO) friction material composition that is free of a copper component, wherein the friction material composition does not include an iron component but includes 15-25 weight % of a non-whisker shaped titanate, relative to the total amount of the friction material composition, as the titanate, 15-25 weight % of zirconium oxide with the average particle diameter of 1.0-4.0 μm, relative to the total amount of the friction material composition, as an inorganic friction modifier, and 4-6 weight % of cleavable mineral particles, relative to the total amount of the friction material composition, as an inorganic friction modifier.

2. The friction material according to claim 1, wherein the non-whisker shaped titanate is potassium titanate.

3. The friction material according to claim 1, wherein the friction material composition includes 2-4 weight % of flaky graphite particles relative to the total amount of the friction material composition as a carbonaceous lubricant.

4. The friction material according to claim 2, wherein the friction material composition includes 2-4 weight % of flaky graphite particles relative to the total amount of the friction material composition as a carbonaceous lubricant.

* * * * *